Aug. 18, 1942.　　　A. CLARKSON　　　2,293,638
VARIABLE SPEED TRANSMISSION ASSEMBLY
Filed April 10, 1941　　　4 Sheets-Sheet 1
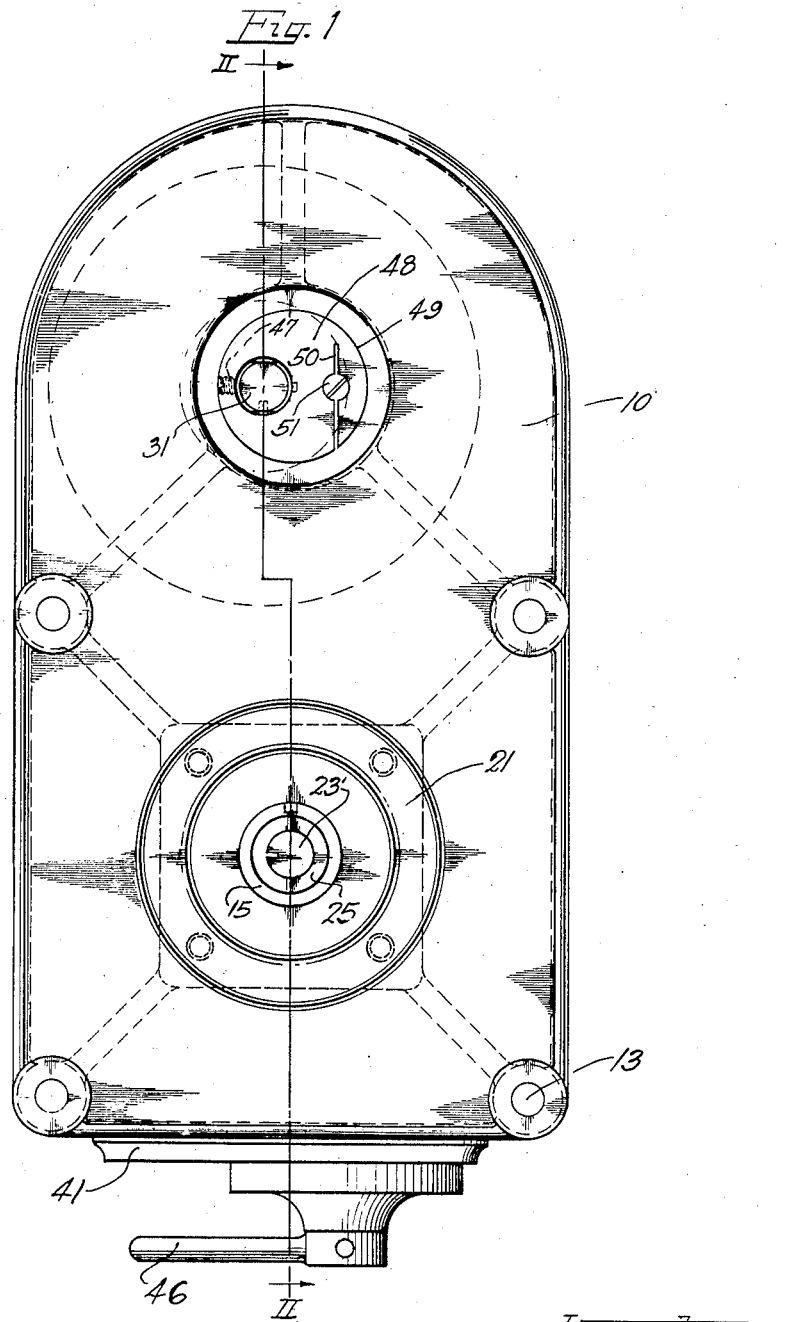
Inventor
Alick Clarkson

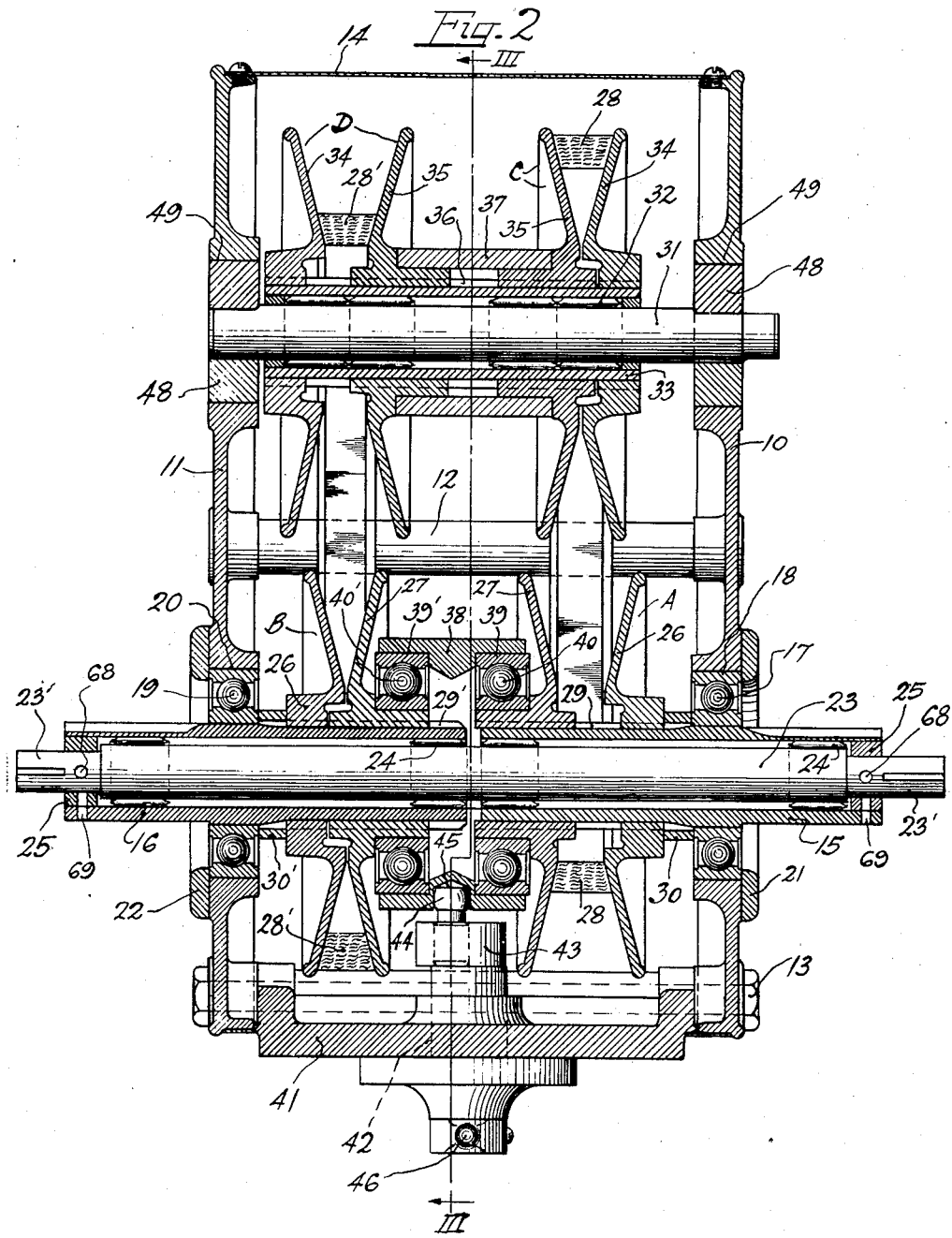

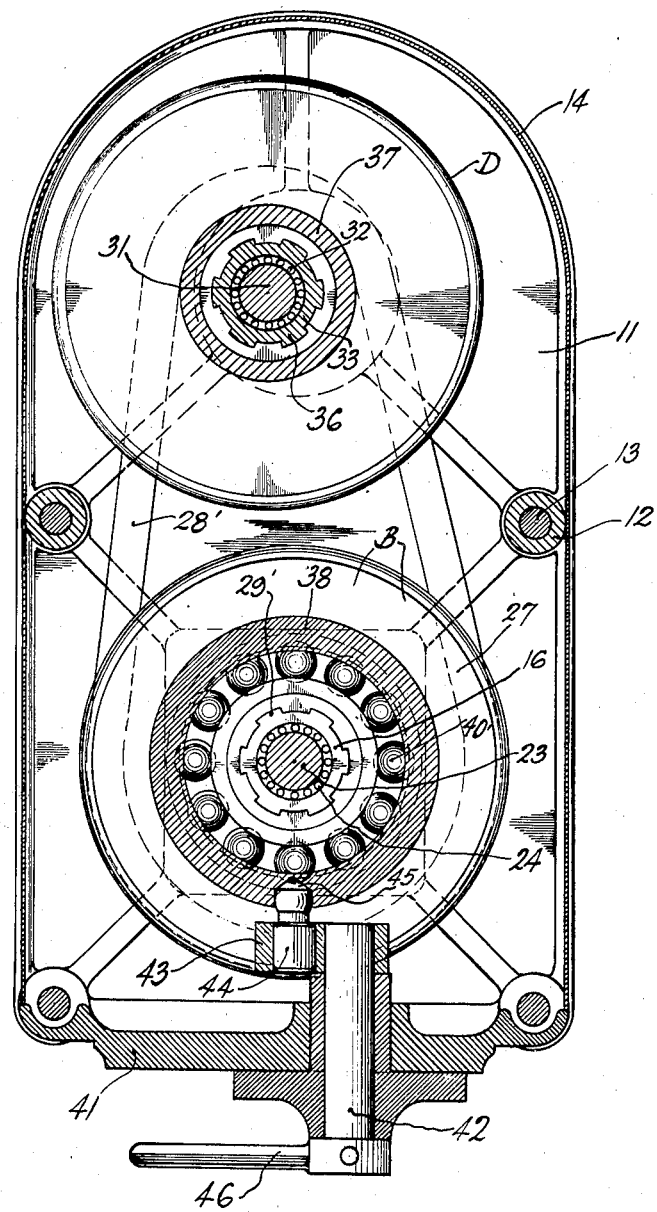

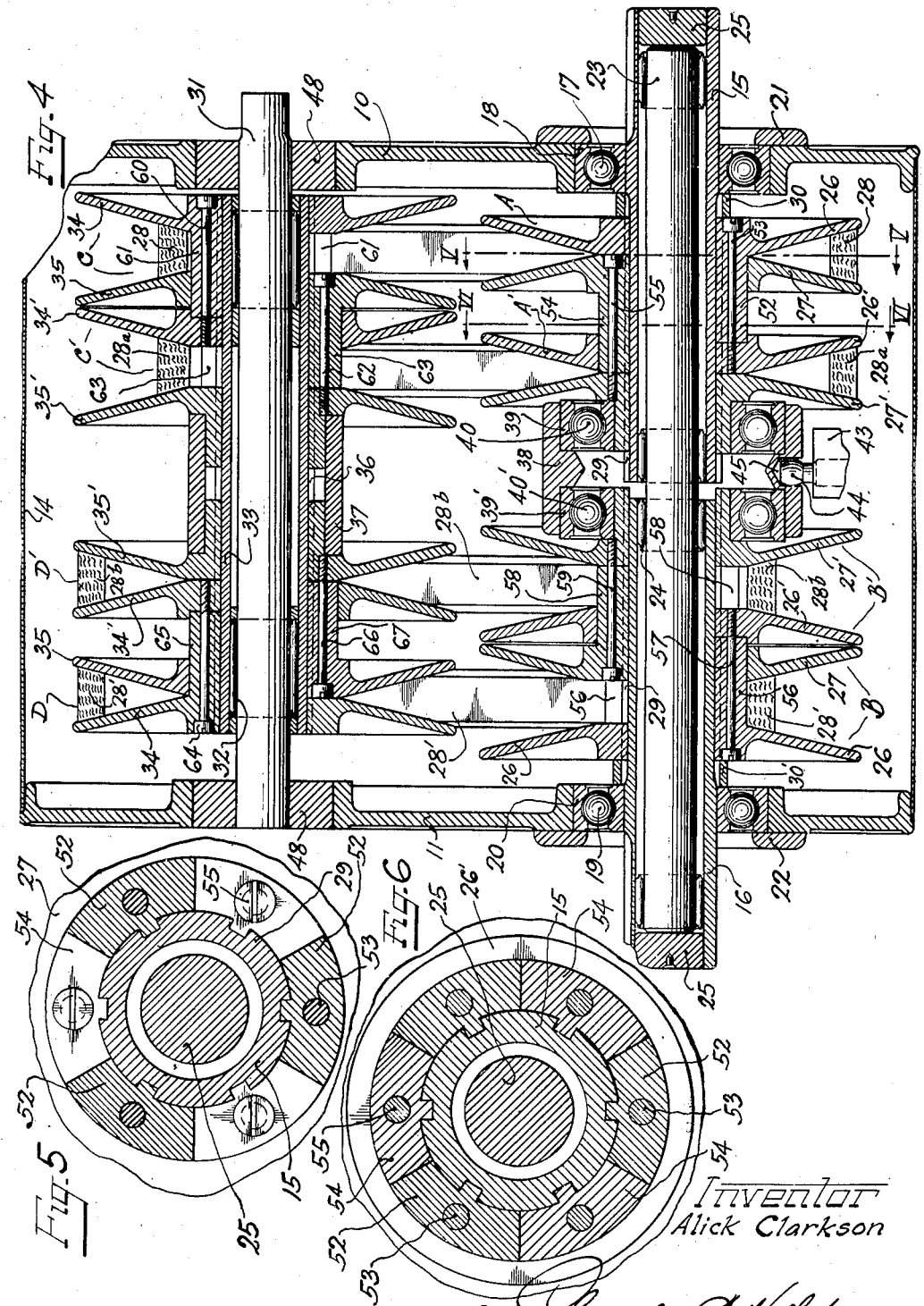

Patented Aug. 18, 1942

2,293,638

UNITED STATES PATENT OFFICE 2,293,638

VARIABLE SPEED TRANSMISSION ASSEMBLY

Alick Clarkson, Itasca, Ill., assignor to Quality Hardware and Machine Corporation, Chicago, Ill., a corporation of Illinois Application April 10, 1941, Serial No. 387,783

1 Claim. (Cl. 74—230.17)

My invention relates to variable speed driving, and particularly to an improved variable speed transmission assembly having a wide range of transmission speeds with all speeds intermediate the maximum and minimum transmission speeds.

An important object of the invention is to produce a compact, unitary and self-contained assembly of transmission elements which may be connected directly between a driving source and driven means, or may be conveniently included in any transmission line.

Another important object of the invention is to utilize transmission elements in the form of sheaves engaged by standard section V-belts, or any other suitable V-belts.

Still a further object is to utilize sheave units each comprising opposed halves relatively movable axially to present varying pitch diameters to a V-belt engaged thereby.

A further important object is to provide an arrangement in which a driving sheave unit and a driven sheave unit are mounted on axially aligned shafts and each connected by a V-belt with a transmission sheave assembly mounted on a countershaft, and with speed setting means between the driving and driven sheave units for adjustment of the movable halves of these units for pitch diameter adjustment for the desired transmission speed.

My invention also involves other important features of structure, arrangement and operation, and all of the various features are incorporated in the structures shown on the drawings, in which drawings—

Figure 1 is a side elevation of the transmission assembly;

Figure 2 is a section on line II—II of Figure 1;

Figure 3 is a section on line III—III of Figure 2;

Figure 4 is a section like Figure 2, but showing a modified arrangement;

Figure 5 is a section on plane V—V of Figure 4; and

Figure 6 is a section on plane VI—VI of Figure 4.

Referring to Figures 1 to 3, the transmission elements are compactly arranged within a housing which is shown as comprising side walls 10 and 11 spaced and held apart by spacing tubes 12 and rods or bolts 13 extending through the side walls and the spacer tubes. A shell 14 of sheet metal may extend around and between the side walls to form the other enclosing sides of the housing.

The driving and driven shaft assembly is located at one end of the housing and comprises the axially aligned tubular shafts 15 and 16. The shaft 15 is journaled by a ball bearing 17 set in the opening 18 of the wall 10, while the shaft 16 is journaled in a ball bearing 19 set in the opening 20 in the side wall 11. Retainer plates 21 and 22 are secured to the outer sides of the side walls 10 and 11 for holding the ball bearings 17 and 19 in position. The shafts 15 and 16 are further supported and held in axial alignment by a shaft 23 extending therethrough, suitable bearings 24 being interposed between the shaft 23 and the shafts 15 and 16 so that the shafts 15 and 16 may rotate relative to each other and to the shaft 23. The outer ends of the shafts 15 and 16 project a distance outwardly from the side walls 10 and 11 for the reception of driving pulleys, coupling members, or other devices for connection of the transmission assembly in service. Plugs 25 may be inserted in the ends of the shafts to hold the aligning shaft 23 in axial alignment.

The shaft 15 supports a sheave unit A comprising the outer half 26 and the inner half 27, the opposed belt-receiving walls of the halves being flared for the reception between them of a driving belt such as a V-belt 28.

The shaft 15 has keys or splines 29 by which the sheave halves are secured to the shaft 15 to rotate therewith. The outer half 26 is frictionally secured to the shaft to be held against axial movement thereon, and between the half and the inner ring of the bearing assembly 17 a spacing ring 30 surrounds the shaft 15. The inner half 27 of the sheave is axially shiftable on the shaft 15.

The sheave unit B mounted on the shaft 16 is the same as the sheave unit A, it comprising the outer and inner halves 26 and 27 receiving the splines 29' of the shaft 16, the outer half 26 being held on the shaft against axial movement thereon and spaced away from the bearing assembly 19 by the spacer ring 30', the inner half 27 being axially shiftable on the shaft 16. The halves of the sheave receive between their flared walls a V-belt 28'.

A countershaft 31 is supported by the side walls 10 and 11 and is parallel with the shaft assembly 15, 16. Journaled on this shaft by suitable anti-friction bearings 32 is the tubular shaft 33, this shaft being rotatable and also axially shiftable on the countershaft 31. The shaft 33 supports the sheave units C and D which are of similar construction, each comprising the outer half 34 and the inner half 35. The shaft 33 has keys or splines 36 receiving the halves of the sheaves. The outer halves 34 of the sheaves C and D are secured at the opposite ends of the shaft 33 to be axially immovable thereon, while the inner halves 35 are axially shiftable on the shaft.

The sheave C is opposite the sheave A and its flaring sides receive between them the V-belt 28. The sheave D is opposite the sheave B, its flaring sides receiving the V-belt 28'. A sleeve or collar 37 receives the hubs of the inner halves 35 to hold them relatively axially spaced.

Surrounding the opposed hubs of the inner halves 27 of the sheaves A and B is an annular frame 38 having annular recesses 39 and 39' in its sides for receiving, respectively, ball bearing assemblies 40 and 40', the inner races of the ball bearings being mounted on the opposed hubs of the halves 27 and the outer races of the bearing assemblies being seated in the recesses 39, 39' of the frame 38, so that upon axial movement of the frame 38 the inner halves 27 will move together axially on their supporting shafts 15 and 16. By the axial shifting of the frame 38 the transmission assembly may be set for the desired transmission speed ratio.

Suitable means is provided for axially shifting the frame 38. As shown, a wall 41 is secured to the ends of the housing walls 10 and 11 and journals a shaft 42 which at its inner end has a crank arm 43 extending therefrom and which carries a pin 44 engaging in a channel 45 in the frame 38 so that, upon rocking of the shaft 42, the frame 38 will be shifted axially for setting for the desired speed ratio. At its outer end the shaft 42 is provided with an actuating arm 46 which may be manually operated for speed ratio setting or which may be operated from some remote point for automatic setting for speed ratio. For example, the transmission assembly may be employed in the driving of a pump and the operation of the setting frame 38 may be automatically controlled in accordance with pump pressure.

Referring to Figure 2, suppose that the shaft 15 is connected to a driving source and that a device connected with the driven shaft 16 is to be driven at various speeds. As shown, the setting frame 38 has been shifted to its left-hand position for separation of the halves of the sheave A and for bringing together the halves of the sheave B, the V-belt 28 being then in engagement with the sheave A at its smallest pitch diameter and its engagement with the sheave C being at the greatest pitch diameter thereof. The drive of the sheave C by the belt 28 is communicated through the shaft 33 to the sheave D, on which the belt 28' is at the smallest pitch diameter, and at the largest pitch diameter of the sheave B. The transmission assembly is thus transmitting at minimum speed of the driving shaft 15 to the driven shaft 16.

If it is desired to increase the speed, the setting frame 38 is shifted toward the right to move the inner half 27 of the sheave A toward its outer half and to move the inner half 27 of the sheave B a corresponding distance away from its outer half. The belt 28 will now shift outwardly in the sheave A to the correspondingly larger pitch diameter and the belt 28 will move correspondingly inwardly on the sheave C to the correspondingly smaller pitch diameter, and the speed of the sheave B is correspondingly increased. As the belt 28 moves inwardly on the sheave C the inner half 35 of the sheave is shifted inwardly, and through the collar 37 the inner half 35 of the sheave D is correspondingly shifted outwardly for outward movement of the belt 28' to a larger pitch diameter, the belt 28' at the sheave B moving inwardly to a shorter pitch diameter. The location of the belt 28' on the sheave D will always be the same as the location of the belt 28 on the sheave A, and the location of the belt 28' on the sheave B will always be the same as the location of the belt on the sheave C. When the setting frame 38 is shifted to the right end of its movement, the belts 28 and 28' will engage the sheaves A and D, respectively, at their largest pitch diameters, and will engage the sheaves C and B at their shortest pitch diameters and the transmission assembly will be transmitting at maximum speed ratio. With the V-belt arrangement shown, the transmission assembly can be set for transmitting at any ratio between minimum and maximum. With the assembly shown the drive speed ratio from the sheave A to the sheave C is duplicated in the same direction by the drive from the sheave D to the driven sheave B, so that we have doubled speed increase or reduction. The transmission will be the same in either direction, that is, either shaft 15 or 16 may be the driving shaft for accurate driving at desired speed ratios of the other or driven shaft.

I have provided simple and efficient means for adjustment of the countershaft 31 for tightening of the belts 28 and 28'. The shaft at its ends is secured, as by set screws 47, to cylindrical blocks 48 which have rotary movement in the openings 49 in the side walls 10 and 11, the shaft being eccentric relative to the blocks, as best shown on Figure 1, so that upon rotation of the blocks the shaft 31 will be moved toward or away from the shaft assembly 15 and 16 for loosening or tightening of the belts, as may be desired. Each of the blocks 48 has a slot 50 intersected by a threaded axially extending hole through the block for receiving a wedging screw 51. The screws 51 are normally set for expanding the blocks into fixed engagement with the walls 10 and 11 so as to hold the shaft 31 in adjusted position for desired belt tension. If it is desired to vary the belt tension the screws 51 are loosened up sufficiently to permit rotary movement of the blocks for setting of the shaft 31 for the desired belt tension, the screws 51 then being reset to lock the blocks 48 against movement. As adjustment is made for speed ratios by the axial shifting of the setting frame 38, the shaft 33 with the sheave assemblies C and D thereon will move to follow the lateral movement of the belts, and the inner sheave halves 35 will be moved axially along the shaft 33 to follow the radial movement of the belts.

Figures 4, 5 and 6 show a modified arrangement involving multiple sheave assemblies connected by multiple belts for power transmission where the load to be driven is comparatively heavy. The general arrangement is the same as that shown in Figures 1, 2 and 3, and the same reference numerals are therefore applied to analogous elements. Each sheave assembly comprises two sheave structures whose corresponding halves are connected together. Associated with the sheave A on the shaft 15 is a companion sheave A' whose halves 26', 27' are respectively connected to move with the halves 26, 27 of the sheave A. The outer half 26 of the sheave A, which half is rigidly secured on the shaft 15, has segmental extensions 52 from its hub, three such extensions being shown. The outer half 26' of the sheave assembly A' is secured to the ends of extensions 52 as by means of screws 53 extending through the extensions, the outer halves of the sheaves A and A' being thus connected to move together.

The inner half 27 of the sheave A has the segmental extensions 54 engaging between the extensions 52 on the half 26, and screws 55 extending through the extensions 54 threaded to the hub of the inner half 27' of the sheave A' so that the inner halves of the sheaves A and A' are connected to move together. The hub of the inner half 27' of the sheave A' is connected by the ball bearing 40 with the setting frame 38. The sheave A is engaged by the V-belt 28 and the sheave A' is engaged by the V-belt 28a.

The driven sheave assemblies B and B' are associated in the same manner as the sheaves A and A'. The outer half 26 of the sheave B has the segmental extensions 56 to which the outer half 26' of the sheave B' is secured by screws 57. The inner half 27 of the sheave B has the segmental extensions 58 to which the inner half of the sheave B' is secured by the screws 59. The inner half 27 of the sheave B' is connected by the ball bearing 41 with the setting frame 38. The V-belt 28' engages the sheave B and V-belt 28b engages the sheave B'.

The shaft 33, which is rotatable and axially shiftable on the non-rotatable countershaft 31, supports the sheave assemblies C, C' and D, D'. The outer halves 34 and 34' of the sheaves C, C' are connected to move together by screws 60 extending through the segmental extensions 61 on the half 34. The inner halves 35, 35' of the two sheaves are connected together by screws 62 extending through the segmental extensions 63 on the half 35.

The outer halves 34, 34' of the sheaves D, D' are connected together by screws 64 passing through the extensions 65 on the half 34, and the inner halves 35, 35' are secured together by screws 66 passing through the extensions 67 on the half 35. The sheaves C, C' receive, respectively, the belts 28 and 28, and the sheaves D and D' receive, respectively, the belts 28' and 28b.

Except for the double sheave assemblies, the structure on Figs. 4, 5 and 6 is the same as that on Figs. 1 to 3, and the operation is the same except that the power is transmitted through double belt connections. The setting of the transmission assembly for the desired transmission ratio is effected by the axial movement of the setting frame 38 in the same manner as described in connection with Figures 1 to 3. Upon axial shift in either direction of the frame 38, the inner halves of the sheaves A, A', B and B' are axially shifted together relative to the outer halves for a corresponding change in pitch diameter for the belts, the transmission sheave assemblies on the countershaft 31 automatically accommodating themselves to the belts in the same manner as described in connection with Figures 1, 2 and 3.

The transmission assemblies shown may be readily adapted for driving transmissions where the driving source and the driven structure are at the same side of the transmission assembly. Referring to Figure 2, the plugs 25 secured in the ends of the shafts 15 and 16 may serve as bearings for the reduced ends 23' of the shaft 23, and these ends provided with keyholes 68 for registry with key passageways 69 into either of which passageways a key may be inserted for engagement in the corresponding keyhole so that the shaft 23 may be keyed to either the shaft 15 or the shaft 16. A driving source, such as a motor, may be then connected with the unkeyed end 23' of the shaft 23 and the structure to be driven could be connected with the adjacent end of the corresponding sheave supporting shaft. Suppose that a key is inserted to connect the left end of the shaft 23 with the sheave supporting shaft 16, then the driving motor on the unkeyed right end of the shaft 23 will transmit power through the shaft 23, the shaft 16, the sheave assembly and belts, to the shaft 15 and from the shaft 15 to the structure to be driven.

I have shown practical and efficient embodiments of the various features of my invention, but I do not desire to be limited to the exact construction and arrangement or operation as shown and described, as changes and modifications may be made without departing from the scope of the invention.

I claim as follows:

A variable speed transmission assembly comprising a housing, two axially aligned independently rotatable tubular driving and driven shafts journaled at their outer ends respectively in the opposed walls of said housing, a V-belt receiving sheave mounted on each of said tubular shafts to rotate therewith and each comprising an outer half axially immovable on the shaft and an inner half slidable axially on the shaft along the inner end thereof, a countershaft, two transmission sheaves on said countershaft each comprising relatively axially movable halves, a belt connecting the sheave on said driving shaft to one of the sheaves on said countershaft and a belt connecting the other sheave on said countershaft with the sheave on said driven shaft, setting means surrounding the inner ends of said driving and driven shafts and coupling together the inner halves of the sheaves on said shafts, means for axially shifting said setting means for axial shift of said coupled-together sheave halves for changing the pitch diameters of said sheaves, an aligning shaft extending through said tubular shafts and journaled therein to be supported solely by said shafts, the ends of said aligning shaft extending beyond said tubular shafts for connection with driving means or means to be driven, and means whereby said aligning shaft may be keyed to either of said tubular shafts to rotate therewith while the other tubular shaft remains free to rotate relative to said aligning shaft or may be unkeyed from both said tubular shafts.

ALICK CLARKSON.